(12) United States Patent
Jeong (10) Patent No.: US 11,669,635 B1
(45) Date of Patent: *Jun. 6, 2023

(54) LEARNING METHOD AND LEARNING DEVICE FOR TRAINING OBFUSCATION NETWORK CAPABLE OF OBFUSCATING ORIGINAL DATA FOR PRIVACY AND TESTING METHOD AND TESTING DEVICE USING THE SAME

(71) Applicant: Deeping Source Inc., Seoul (KR)

(72) Inventor: Jong Hu Jeong, Seoul (KR)

(73) Assignee: DEEPING SOURCE INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,553

(22) Filed: Apr. 14, 2022

(30) Foreign Application Priority Data

Nov. 29, 2021 (KR) .......................... 10-2021-0167791

(51) Int. Cl.
| | |
|---|---|
| *G06F 21/62* | (2013.01) |
| *G06N 3/084* | (2023.01) |
| *G06N 3/045* | (2023.01) |
| *F02D 41/14* | (2006.01) |

(52) U.S. Cl.
CPC ......... *G06F 21/6245* (2013.01); *G06N 3/045* (2023.01); *G06N 3/084* (2013.01); *F02D 2041/1432* (2013.01); *G05B 2219/41166* (2013.01)

(58) Field of Classification Search
CPC ..... G06V 10/774; G06F 21/6245; G06N 3/08
See application file for complete search history.

(56) References Cited

U.S. PATENT DOCUMENTS

| | | | | |
|---|---|---|---|---|
| 11,017,319 | B1 * | 5/2021 | Kim | .................. G06F 21/14 |
| 11,023,777 | B1 * | 6/2021 | Koo | .................. G06V 10/40 |
| 11,200,494 | B1 * | 12/2021 | Kim | .................. G06N 3/08 |

(Continued)

FOREIGN PATENT DOCUMENTS

| | | | |
|---|---|---|---|
| KR | 102220094966 A | 7/2022 | |
| WO | WO-2022086145 A1 * | 4/2022 | .......... G06F 21/6254 |

OTHER PUBLICATIONS

Leroux et al. (Privacy Aware Offloading of Deep Neural Networks, arXiv:1805.12024v1 May 30, 2018, 3 pages) (Year: 2018).*

(Continued)

*Primary Examiner* — Oleg Korsak
(74) *Attorney, Agent, or Firm* — Amster, Rothstein & Ebenstein LLP (57) ABSTRACT

A learning method for training an obfuscation network capable of obfuscating original data for privacy, including steps of: (a) inputting training data into the obfuscation network to filter frequency information of the training data and thus generate obfuscated data; and (b) (i) inputting the obfuscated data into a learning network to generate characteristic information by performing learning operation on the obfuscated data, (ii) generating at least one task loss by referring to (ii-1) the characteristic information and its corresponding ground truth or (ii-2) a task-specific output, generated by using the characteristic information, and its corresponding ground truth, and (iii) training at least one of the learning network and the obfuscation network through a backpropagation of the task loss.

12 Claims, 8 Drawing Sheets

(56) References Cited

U.S. PATENT DOCUMENTS

| | | | |
|---|---|---|---|
| 11,308,359 B1* | 4/2022 | Jeong | G06N 3/08 |
| 11,366,930 B1* | 6/2022 | Jeong | G06N 3/08 |
| 11,423,643 B1* | 8/2022 | Jeong | G06F 21/6245 |

OTHER PUBLICATIONS

Zhang et al. (Privacy-preserving Machine Learning through Data Obfuscation, arXiv:1807.01860v2 Jul. 13, 2018, 12 pages) (Year: 2018).*

Boulemtafes et al. (A review of privacy-preserving techniques for deep learning. Neurocomputing, Elsevier, 2020, 384, pp. 21-45) (Year: 2020).*

Korean Office Action issued in Application No. 10-2022-159792, dated Feb. 16, 2023.

Abhishek Singh, et al., DISCO: Dynamic and Invariant Sensitive Channel Obfuscation for Deep Neural Networks, Massachuset Institute of Technology, Harvard Medical School (Jun. 15, 2021).

Alice Cohen-Hadria, et al., Voice Anonymization In Urban Sound Recording, Institute of Electrical and Electronics Engineers. IEEE Xplore, downloaded on Jan. 25, 2023.

\* cited by examiner

LEARNING METHOD AND LEARNING DEVICE FOR TRAINING OBFUSCATION NETWORK CAPABLE OF OBFUSCATING ORIGINAL DATA FOR PRIVACY AND TESTING METHOD AND TESTING DEVICE USING THE SAME

CROSS REFERENCE TO RELATED APPLICATION

This application claims the benefit of priority to Korean Provisional Patent Application No. 10-2021-0167791, filed on Nov. 29, 2021, the entire contents of which being incorporated herein by reference.

FIELD OF THE DISCLOSURE

The present disclosure relates to a learning method for training an obfuscation network capable of obfuscating, e.g., anonymizing or concealing, original data to protect privacy and a learning device using the same, and to a testing method for testing the trained obfuscation network capable of obfuscating the original data to protect privacy and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, voice data, as well as all of structured data used by conventional enterprises or public institutions. Data as such is referred to as the big data in the sense that common software tools and computer systems cannot easily handle such a huge volume of data.

And, although such a big data may carry no meaning by itself, it can be useful for generating new data, judging or predicting in various fields through machine learning on patterns and the like.

Recently, due to the strengthening of privacy protection acts, it is required to delete information that can be used for identifying individuals from the data or to obtain consent from the individuals in order to trade or share such a big data. However, it is not easy to check whether any information that can be used for identifying the individuals is present among such a large amount of big data, and it is impossible to obtain the consent from every individual. Therefore, various techniques for such purposes have emerged.

As an example of a related prior art, a technique is disclosed in Korean Patent Registration No. 1861520. According to this technique, a face-concealing method, e.g., a face-anonymizing method, is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, where the second image is generated to have a facial shape different from that of the facial region detected in the detection step.

However, according to conventional techniques as well as the technique described above, it is determined whether identification information such as faces, text, etc. is included in the data, and then a portion corresponding to the identification information is masked or blurred. As a result, a machine learning algorithm cannot utilize such data due to distortion of original data. Also, in some cases, the data may contain unexpected identification information which cannot be concealed, e.g., anonymized. In particular, a conventional security camera performs an anonymizing process by blurring every pixel changed between frames due to a target to be anonymized moving between the frames in a video, and if the anonymizing process is performed in this manner, critical information such as facial expression of an anonymized face becomes different from information contained in an original video, and also, personal identification information overlooked during face detection may remain on the original video.

Accordingly, the applicant(s) of the present disclosure proposes a method for generating obfuscated data by obfuscating the original data such that the obfuscated data is different from the original data, while a result of inputting the original data into a learning model and a result of inputting the obfuscated data into the learning model are same as or similar to each other.

SUMMARY OF THE DISCLOSURE

It is an object of the present disclosure to solve all the aforementioned problems.

It is another object of the present disclosure to perform obfuscation, e.g., anonymization or concealment, on privacy information in a simple and accurate way.

It is still another object of the present disclosure to protect privacy and security of original data by generating obfuscated data, e.g., anonymized data or concealed data, through irreversibly obfuscating the original data.

It is still yet another object of the present disclosure to generate obfuscated data recognized as similar or same by computers, but recognized as different by humans.

It is still yet another object of the present disclosure to stimulate a big data trade market.

In order to accomplish objects above, representative structures of the present disclosure are described as follows:

In accordance with one aspect of the present disclosure there is provided a learning method for training an obfuscation network capable of obfuscating original data for privacy, including steps of: (a) a learning device inputting training data into the obfuscation network, to thereby instruct the obfuscation network to filter frequency information of the training data and thus generate obfuscated data; and (b) the learning device (i) inputting the obfuscated data into a learning network designed to perform a specific task, to thereby instruct the learning network to generate characteristic information by performing learning operation on the obfuscated data, (ii) generating at least one task loss by referring to (ii-1) the characteristic information and its corresponding ground truth or (ii-2) a task-specific output, generated by using the characteristic information, and its corresponding ground truth, and (iii) training at least one of the learning network and the obfuscation network through a backpropagation of the task loss.

As one example, at the step of (a), the learning device inputs the training data into the obfuscation network, to thereby instruct the obfuscation network to (i) generate encoded data by encoding the training data through an encoding network, (ii) generate high-frequency data by only allowing high-frequency regions in the encoded data to pass through a high-pass filter, (iii) generate low-frequency data by only allowing low-frequency regions in the training data to pass through a low-pass filter, and (iv) concatenate the high-frequency data and the low-frequency data to generate the obfuscated data.

As one example, at the step of (b), the learning device (i) (i-1) inputs the obfuscated data into the learning network, to thereby instruct the learning network to generate first characteristic information by performing the learning operation on the obfuscated data, (i-2) generates a first task loss by referring to the first characteristic information and its corresponding ground truth or a first task-specific output, generated by using the first characteristic information, and its corresponding ground truth, and (i-3) trains the learning network through a first backpropagation of the first task loss, thereby allowing the learning network to be a trained learning network, and (ii) (ii-1) inputs the obfuscated data into the trained learning network, to thereby instruct the trained learning network to generate second characteristic information by performing the learning operation on the obfuscated data, (ii-2) generates a second task loss by referring to the second characteristic information and its corresponding ground truth or a second task-specific output, generated by using the second characteristic information, and its corresponding ground truth, and (ii-3) trains the encoding network through a second backpropagation of the second task loss.

As one example, at the step of (a), the learning device inputs the training data into the obfuscation network, to thereby instruct the obfuscation network to (i) generate high-frequency data by only allowing high-frequency regions in the training data to pass through a high-pass filter, (ii) generate low-frequency data by only allowing low-frequency regions in the training data to pass through a low-pass filter, and (iii) concatenate the high-frequency data and the low-frequency data to generate the obfuscated data.

As one example, at the step of (a), the learning device inputs the training data into the obfuscation network, to thereby instruct the obfuscation network to (i) generate encoded data by encoding the training data through an encoding network, and (ii) generate the obfuscated data by removing one or more predetermined frequency bands in the encoded data through a band reject filter.

As one example, at the step of (a), the learning device inputs the training data into the obfuscation network, to thereby instruct the obfuscation network to (i) generate frequency-obfuscated data by removing one or more predetermined frequency bands in the training data through a band reject filter, and (ii) generate the obfuscated data by encoding the frequency-obfuscated data through an encoding network.

In accordance to another aspect of the present disclosure there is provided a testing method for testing an obfuscation network capable of obfuscating original data for privacy, including steps of: (a) on condition that a learning device has trained an obfuscation network to acquire a trained obfuscation network by performing processes of (i) inputting first training data into the obfuscation network, to thereby instruct the obfuscation network to filter frequency information of the first training data and thus generate first obfuscated data, and (ii) (ii-1) inputting the first obfuscated data into a first learning network designed to perform a first task, to thereby instruct the first learning network to generate first characteristic information by performing learning operation on the first obfuscated data, (ii-2) generating a first task loss by referring to the first characteristic information and its corresponding ground truth or a first task-specific output, generated by using the first characteristic information, and its corresponding ground truth, and (ii-3) training at least one of the first learning network and the obfuscation network through a backpropagation of the first task loss, a testing device inputting second training data into the trained obfuscation network, to thereby instruct the trained obfuscation network to filter frequency information of the second training data and thus generate second obfuscated data; and (b) the testing device (i) inputting the second obfuscated data into a second learning network designed to perform a second specific task, to thereby instruct the second learning network to generate second characteristic information by performing the learning operation on the second obfuscated data, (ii) generating a second task loss by referring to (ii-1) the second characteristic information and its corresponding ground truth or (ii-2) a second task-specific output, generated by using the second characteristic information, and its corresponding ground truth, and (iii) training the second learning network through a backpropagation of the second task loss.

As one example, the testing method further includes a step of: (c) the testing device (i) inputting third training data or third obfuscated data, acquired by filtering frequency information of the third training data through the trained obfuscation network, into a trained second learning network, to thereby instruct the trained second learning network to generate third characteristic information by performing the learning operation on the third training data or the third obfuscated data, and (ii) evaluating the trained second learning network by using the third characteristic information or a third task-specific output generated from the third characteristic information.

As one example, at the step of (a), the testing device inputs the second training data into the trained obfuscation network, to thereby instruct the trained obfuscation network to (i) generate encoded data by encoding the second training data through a trained encoding network, (ii) generate high-frequency data by only allowing high-frequency regions in the encoded data to pass through a high-pass filter, (iii) generate low-frequency data by only allowing low-frequency regions in the second training data to pass through a low-pass filter, and (iv) concatenate the high-frequency data and the low-frequency data to generate the second obfuscated data.

As one example, at the step of (a), the testing device inputs the second training data into the trained obfuscation network, to thereby instruct the trained obfuscation network to (i) generate high-frequency data by only allowing high-frequency regions in the second training data to pass through a high-pass filter, (ii) generate low-frequency data by only allowing low-frequency regions in the second training data to pass through a low-pass filter, and (iii) concatenate the high-frequency data and the low-frequency data to generate the second obfuscated data.

As one example, at the step of (a), the testing device inputs the second training data into the trained obfuscation network, to thereby instruct the trained obfuscation network to (i) generate encoded data by encoding the second training data through a trained encoding network, and (ii) generate the second obfuscated data by removing one or more predetermined frequency bands in the encoded data through a band reject filter.

As one example, at the step of (a), the testing device inputs the second training data into the trained obfuscation network, to thereby instruct the trained obfuscation network to (i) generate frequency-obfuscated data by removing one or more predetermined frequency bands in the second training data through a band reject filter, and (ii) generate the second obfuscated data by encoding the frequency-obfuscated data through a trained encoding network.

In accordance to still another aspect of the present disclosure there is provided a learning device for training an obfuscation network capable of obfuscating original data for privacy, including: at least one memory that stores instructions; and at least one processor configured to execute the instructions to perform: processes of (I) inputting training data into the obfuscation network, to thereby instruct the obfuscation network to filter frequency information of the training data and thus generate obfuscated data; and (II) (i) inputting the obfuscated data into a learning network designed to perform a specific task, to thereby instruct the learning network to generate characteristic information by performing learning operation on the obfuscated data, (ii) generating at least one task loss by referring to (ii-1) the characteristic information and its corresponding ground truth or (ii-2) a task-specific output, generated by using the characteristic information, and its corresponding ground truth, and (iii) training at least one of the learning network and the obfuscation network through a backpropagation of the task loss.

As one example, at the process of (I), the processor inputs the training data into the obfuscation network, to thereby instruct the obfuscation network to (i) generate encoded data by encoding the training data through an encoding network, (ii) generate high-frequency data by only allowing high-frequency regions in the encoded data to pass through a high-pass filter, (iii) generate low-frequency data by only allowing low-frequency regions in the training data to pass through a low-pass filter, and (iv) concatenate the high-frequency data and the low-frequency data to generate the obfuscated data.

As one example, at the process of (II), the processor (i) (i-1) inputs the obfuscated data into the learning network, to thereby instruct the learning network to generate first characteristic information by performing the learning operation on the obfuscated data, (i-2) generates a first task loss by referring to the first characteristic information and its corresponding ground truth or a first task-specific output, generated by using the first characteristic information, and its corresponding ground truth, and (i-3) trains the learning network through a first backpropagation of the first task loss, thereby allowing the learning network to be a trained learning network, and (ii) (ii-1) inputs the obfuscated data into the trained learning network, to thereby instruct the trained learning network to generate second characteristic information by performing the learning operation on the obfuscated data, (ii-2) generates a second task loss by referring to the second characteristic information and its corresponding ground truth or a second task-specific output, generated by using the second characteristic information, and its corresponding ground truth, and (ii-3) trains the encoding network through a second backpropagation of the second task loss.

As one example, at the process of (I), the processor inputs the training data into the obfuscation network, to thereby instruct the obfuscation network to (i) generate high-frequency data by only allowing high-frequency regions in the training data to pass through a high-pass filter, (ii) generate low-frequency data by only allowing low-frequency regions in the training data to pass through a low-pass filter, and (iii) concatenate the high-frequency data and the low-frequency data to generate the obfuscated data.

As one example, at the process of (I), the processor inputs the training data into the obfuscation network, to thereby instruct the obfuscation network to (i) generate encoded data by encoding the training data through an encoding network, and (ii) generate the obfuscated data by removing one or more predetermined frequency bands in the encoded data through a band reject filter.

As one example, at the process of (I), the processor inputs the training data into the obfuscation network, to thereby instruct the obfuscation network to (i) generate frequency-obfuscated data by removing one or more predetermined frequency bands in the training data through a band reject filter, and (ii) generate the obfuscated data by encoding the frequency-obfuscated data through an encoding network.

In accordance to still yet another aspect of the present disclosure there is provided a testing device for testing an obfuscation network capable of obfuscating original data for privacy, including: at least one memory that stores instructions; and at least one processor configured to execute the instructions to perform: processes of (I) on condition that a learning device has trained an obfuscation network to acquire a trained obfuscation network by performing processes of (i) inputting first training data into the obfuscation network, to thereby instruct the obfuscation network to filter frequency information of the first training data and thus generate first obfuscated data, and (ii) (ii-1) inputting the first obfuscated data into a first learning network designed to perform a first task, to thereby instruct the first learning network to generate first characteristic information by performing learning operation on the first obfuscated data, (ii-2) generating a first task loss by referring to the first characteristic information and its corresponding ground truth or a first task-specific output, generated by using the first characteristic information, and its corresponding ground truth, and (ii-3) training at least one of the first learning network and the obfuscation network through a backpropagation of the first task loss, inputting second training data into the trained obfuscation network, to thereby instruct the trained obfuscation network to filter frequency information of the second training data and thus generate second obfuscated data; and (II) (i) inputting the second obfuscated data into a second learning network designed to perform a second specific task, to thereby instruct the second learning network to generate second characteristic information by performing the learning operation on the second obfuscated data, (ii) generating a second task loss by referring to (ii-1) the second characteristic information and its corresponding ground truth or (ii-2) a second task-specific output, generated by using the second characteristic information, and its corresponding ground truth, and (iii) training the second learning network through a backpropagation of the second task loss.

As one example, the processor further performs a process of (III) (i) inputting third training data or third obfuscated data, acquired by filtering frequency information of the third training data through the trained obfuscation network, into a trained second learning network, to thereby instruct the trained second learning network to generate third characteristic information by performing the learning operation on the third training data or the third obfuscated data, and (ii) evaluating the trained second learning network by using the third characteristic information or a third task-specific output generated from the third characteristic information.

As one example, the processor, at the process of (I), inputs the second training data into the trained obfuscation network, to thereby instruct the trained obfuscation network to (i) generate encoded data by encoding the second training data through a trained encoding network, (ii) generate high-frequency data by only allowing high-frequency regions in the encoded data to pass through a high-pass filter, (iii) generate low-frequency data by only allowing low-frequency regions in the second training data to pass through a low-pass filter, and (iv) concatenate the high-frequency data and the low-frequency data to generate the second obfuscated data.

As one example, the processor, at the process of (I), inputs the second training data into the trained obfuscation network, to thereby instruct the trained obfuscation network to (i) generate high-frequency data by only allowing high-frequency regions in the second training data to pass through a high-pass filter, (ii) generate low-frequency data by only allowing low-frequency regions in the second training data to pass through a low-pass filter, and (iii) concatenate the high-frequency data and the low-frequency data to generate the second obfuscated data.

As one example, the processor, at the process of (I), inputs the second training data into the trained obfuscation network, to thereby instruct the trained obfuscation network to (i) generate encoded data by encoding the second training data through a trained encoding network, and (ii) generate the second obfuscated data by removing one or more predetermined frequency bands in the encoded data through a band reject filter.

As one example, the processor, at the process of (I), inputs the second training data into the trained obfuscation network, to thereby instruct the trained obfuscation network to (i) generate frequency-obfuscated data by removing one or more predetermined frequency bands in the second training data through a band reject filter, and (ii) generate the second obfuscated data by encoding the frequency-obfuscated data through a trained encoding network.

In addition, recordable media that are readable by a computer for storing a computer program to execute the method of the present disclosure is further provided.

BRIEF DESCRIPTION OF THE DRAWINGS

The following drawings to be used for explaining example embodiments of the present disclosure are only part of example embodiments of the present disclosure and other drawings can be acquired based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

Figure 1:
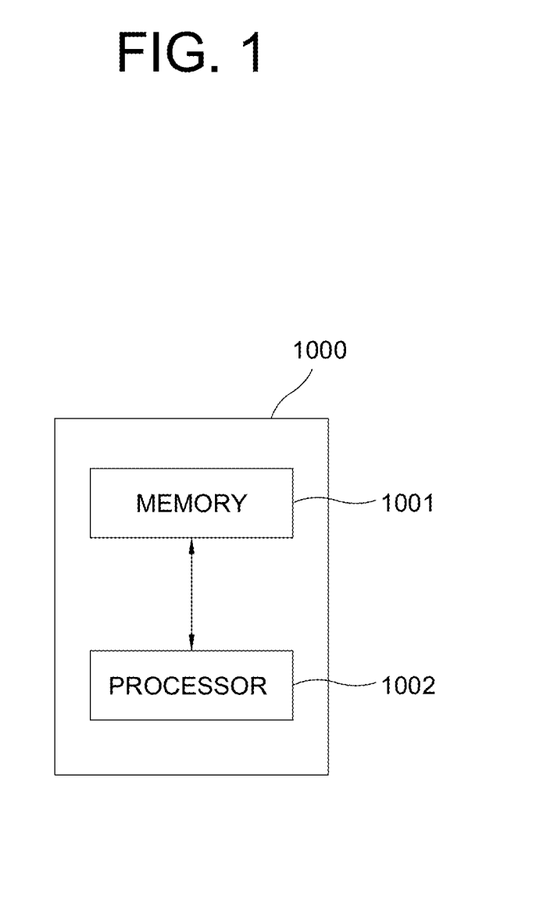
FIG. 1 is a drawing schematically illustrating a learning device for training an obfuscation network capable of obfuscating, e.g., anonymizing or concealing, original data in accordance with one example embodiment of the present disclosure.

FIG. 1 is a drawing schematically illustrating a learning device for training an obfuscation network capable of obfuscating, e.g., anonymizing or concealing, original data in accordance with one example embodiment of the present disclosure.

Referring to FIG. 1, the learning device 1000 may include a memory 1001 to store instructions used in training the obfuscation network capable of obfuscating the original data for privacy and a processor 1002 for performing processes in training the obfuscation network capable of obfuscating the original data for privacy according to the instructions stored in memory 1001 in accordance with one example embodiment.

Specifically, the learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific manner as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

On condition that training data is acquired, the processor 1002 of the learning device 1000 may (i) input the training data into the obfuscation network, to thereby instruct the obfuscation network to filter frequency information of the training data and thus generate obfuscated data, (ii) input the obfuscated data into a learning network designed to perform a specific task, to thereby instruct the learning network to generate characteristic information by performing learning operation on the obfuscated data, (iii) generate at least one task loss by referring to (iii-1) the characteristic information and its corresponding ground truth or (iii-2) a task-specific output, generated by using the characteristic information, and its corresponding ground truth, and (iv) train at least one of the learning network and the obfuscation network through a backpropagation of the task loss. Herein, the processor 1002 of the learning device 1000 may train the learning network and the obfuscation network sequentially.

For example, the processor 1002 of the learning device 1000 may (i) input the obfuscated data into the learning network, to thereby instruct the learning network to generate first characteristic information by performing the learning operation on the obfuscated data, (ii) generate a first task loss by referring to (ii-1) the first characteristic information and its corresponding ground truth or (ii-2) a first task-specific output, generated by using the first characteristic information, and its corresponding ground truth, and (iii) train the learning network through a first backpropagation of the first task loss, thereby allowing the learning network to be a trained learning network. Further, the processor 1002 of the learning device 1000 may (i) input the obfuscated data into the trained learning network, to thereby instruct the trained learning network to generate second characteristic information by performing the learning operation on the obfuscated data, (ii) generate a second task loss by referring to (ii-1) the second characteristic information and its corresponding ground truth or (ii-2) a second task-specific output, generated by using the second characteristic information, and its corresponding ground truth, and (iii) train the obfuscation network through a second backpropagation of the second task loss.

From the above processes, the processor 1002 of the learning device 1000 may train the obfuscation network such that an outputted result of the learning network whose input is the obfuscated data is same as or similar to an outputted result of the learning network whose input is the training data. Additionally, the processor 1002 of the learning device 1000 may train the learning network to use the obfuscated data to perform the specific task.

A method for training the obfuscation network capable of obfuscating, e.g., anonymizing or concealing, the original data for privacy by using the learning device 1000 in accordance with one example embodiment of the present disclosure is described by referring to FIG. 2 as follows.

First, if the training data 10 is acquired, the learning device 1000 may input the training data 10 into the obfuscation network 1100, to thereby instruct the obfuscation network 1100 to filter the frequency information of the training data 10 and thus generate the obfuscated data 40.

For example, the obfuscation network 1100 may input the training data 10 into an encoding network 1110, to thereby instruct the encoding network 1110 to encode the training data 10 and thus generate encoded data.

Herein, the encoding network 1110 may encode the training data 10 to generate embeddings, i.e., the encoded data that is feature data acquired by encoding the training data 10. Further, the encoding network 1110 may be configured as a CNN(convolutional neural network), but it is not limited thereto.

Furthermore, the obfuscation network 1100 may input the encoded data into a high-pass filter 1120, to thereby instruct the high-pass filter 1120 to generate high-frequency data 20 by only allowing high-frequency regions in the encoded data to pass therethrough.

Herein, the high-frequency regions may be regions in which a degree of change in values of the training data 10 or the encoded data is determined as being larger than a first predetermined threshold. For example, if the training data 10 is an image, the high-frequency regions may be regions in which a change in the intensity of the training data or the encoded data is larger than a first predetermined intensity. The high-frequency regions may usually appear in edges, e.g., corners, of an object in the image.

Moreover, the obfuscation network 1100 may input the training data 10 into a low-pass filter 1130, to thereby instruct the low-pass filter 1130 to generate low-frequency data 30 by only allowing low-frequency regions in the training data 10 to pass therethrough.

Herein, the low-frequency regions may be regions in which a degree of change in values of the training data or the encoded data is determined as being smaller than a second predetermined threshold. Herein, the second predetermined threshold is set as much smaller than the first predetermined threshold. For example, if the training data 10 is an image, the low-frequency regions may be regions in which a change in the intensity of the training data or the encoded data is smaller than a second predetermined intensity. The low-frequency regions may usually appear in a background of the image or inner areas of an object in the image.

Afterward, the obfuscation network 1100 may concatenate the high-frequency data 20 and the low-frequency data 30 to generate the obfuscated data 40.

Next, the learning device 1000 may input the obfuscated data 40 into the learning network 1500 designed to perform the specific task, to thereby instruct the learning network 1500 to generate characteristic information to be corresponding to the specific task by performing learning operation on the obfuscated data 40 or generate the task-specific output by using the characteristic information.

Herein, the learning network 1500 may include a machine learning network, but the scope of the present disclosure is not limited thereto, and may include any learning networks capable of generating the characteristic information or the task-specific output by applying its learning operation to the obfuscated data 40. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be obfuscated, e.g., a subject to be anonymized or concealed, may be privacy information included in the training data 10, i.e., the original data. Herein, the privacy information may include any information related to a person, such as personal identification information, personal medical information, personal biometric information, personal behavioral information, etc.

And, the characteristic information may be features or logits corresponding to the obfuscated data 40. Also, the characteristic information may be feature values related to certain features in the obfuscated data 40, or the logits including values of at least one of vectors, matrices, and coordinates related to the certain features. For example, if the training data 10 is facial image data, the result above may be classes for face recognition, facial features, e.g., laughing expressions, coordinates of facial landmark points, e.g., both end points on far sides of an eye.

Meanwhile, the task-specific output may be an output of a task to be performed by the learning network 1500, and may have various results according to the task of the learning network 1500, such as a probability of a class for classification, coordinates resulting from regression for location detection, etc. Further, an activation function of an activation unit may be applied to the characteristic information outputted from the learning network 1500, to thereby generate the task-specific output according to the task to be performed by the learning network 1500. Herein, the activation function may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the learning network 1500 performs the task for the classification, the learning device 1000 may map the characteristic information outputted from the learning network 1500 onto each of classes, to thereby generate one or more probabilities of the obfuscated data 40 for each of the classes. Herein, each of the probabilities for each of the classes may represent each of probabilities of the characteristic information outputted from the learning network 1500 for each of the classes being true. For example, if the training data is the facial image data, a probability of the face having a laughing expression may be outputted as 0.75, and a probability of the face not having the laughing expression may be outputted as 0.25, and the like. Herein, a softmax algorithm may be used for mapping the characteristic information outputted from the learning network 1500 onto each of the classes, but the scope of the present disclosure is not limited thereto, and various algorithms may be used for mapping the characteristic information onto each of the classes.

Next, the learning device 1000 may generate the task loss by referring to the characteristic information outputted from the learning network 1500 and its corresponding ground truth or the task-specific output, generated by using the characteristic information, and its corresponding ground truth and train at least one of the learning network 1500 and the obfuscation network 1100 through a backpropagation of the task loss.

Herein, in the case of the obfuscation network 1100 is comprised of the encoding network 1110, the high-pass filter 1120, and the low-pass filter 1130, the learning device 1000 may sequentially train the learning network 1500 and the encoding network 1110.

For example, the learning device 1000 may (i) input the obfuscated data 40 into the learning network 1500, to thereby instruct the learning network 1500 to generate the first characteristic information or the first task-specific output, generated by using the first characteristic information, by performing the learning operation on the obfuscated data 40, (ii) generate the first task loss by referring to (ii-1) the first characteristic information and its corresponding ground truth or (ii-2) the first task-specific output, generated by using the first characteristic information, and its corresponding ground truth, and (iii) train the learning network 1500 through a backpropagation of the first task loss, thereby allowing the learning network 1500 to be a trained learning network.

Further, the learning device 1000 may (i) input the obfuscated data 40 into the trained learning network, to thereby instruct the trained learning network to generate the second characteristic information or the second task-specific information, generated by using the second characteristic information, by performing the learning operation on the obfuscated data 40, (ii) generate the second task loss by referring to (ii-1) the second characteristic information and its corresponding ground truth or (ii-2) the second task-specific output, generated by using the second characteristic information, and its corresponding ground truth, and (iii) train the encoding network 1110 through a backpropagation of the second task loss.

The method of training the obfuscation network 1100 using one learning network 1500 designed to perform the specific task is described above, however, contrary to above, it is also possible to train the obfuscation network 1100 using multiple learning networks 1500 that are designed to perform different tasks.

From the above method, the obfuscation network 1100 may obfuscate any inputted data so that humans cannot recognize the inputted data from the obfuscated data 40, but the learning network 1500 can. Additionally, the learning network 1500 may recognize the obfuscated data 40, i.e., obfuscated training data, as same as or similar to the training image.

Figure 2:
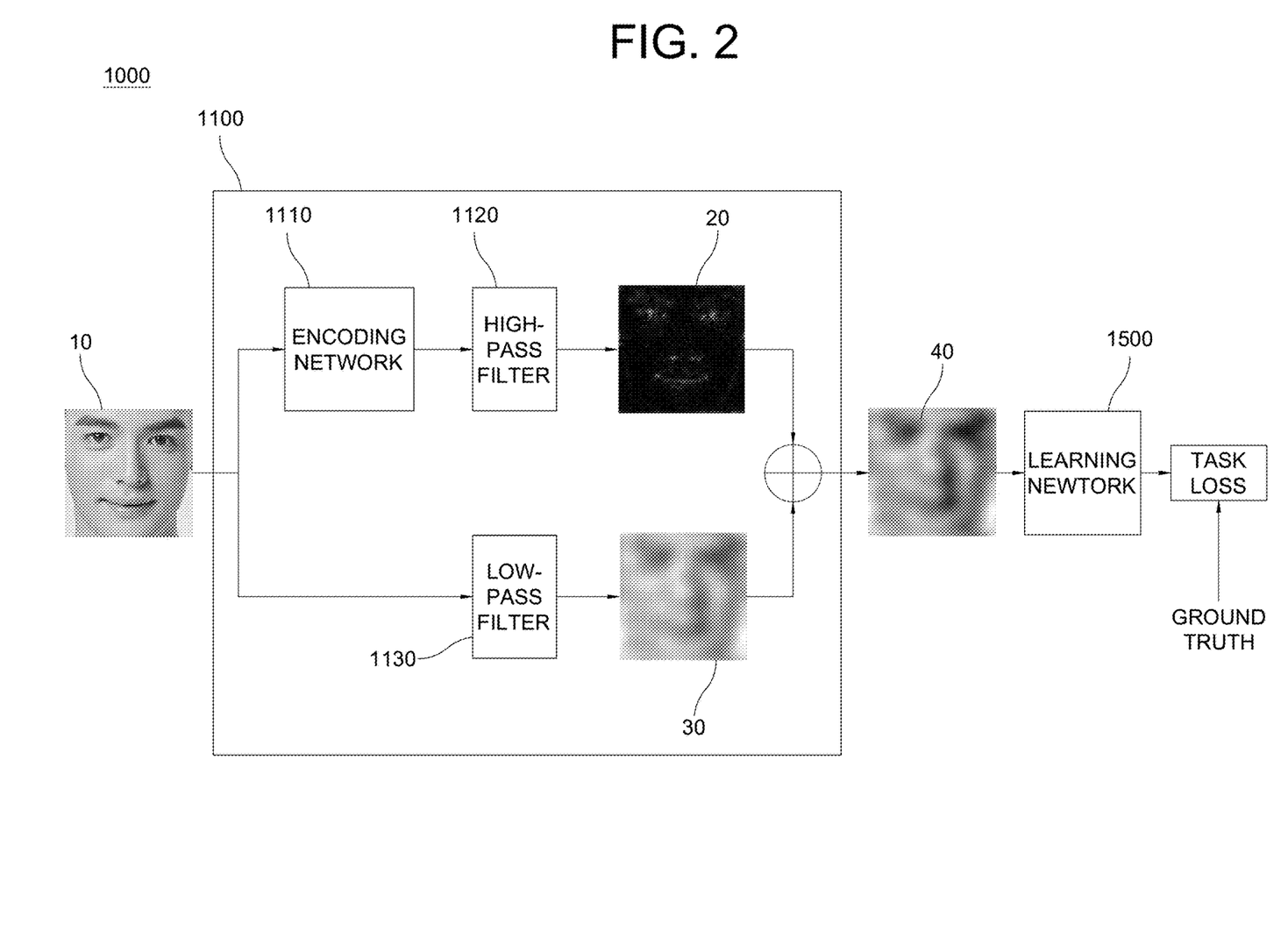
FIG. 2 is a drawing schematically illustrating a learning method for training the obfuscation network capable of obfuscating, e.g., anonymizing or concealing, the original data in accordance with one example embodiment of the present disclosure.

It is appreciated that although FIG. 2 illustrates the obfuscation network 1100 comprised of the encoding network 1110, the high-pass filter 1120 and the low-pass filter 1130, the obfuscation network 1100 may be configured in other various ways.

Figure 3:
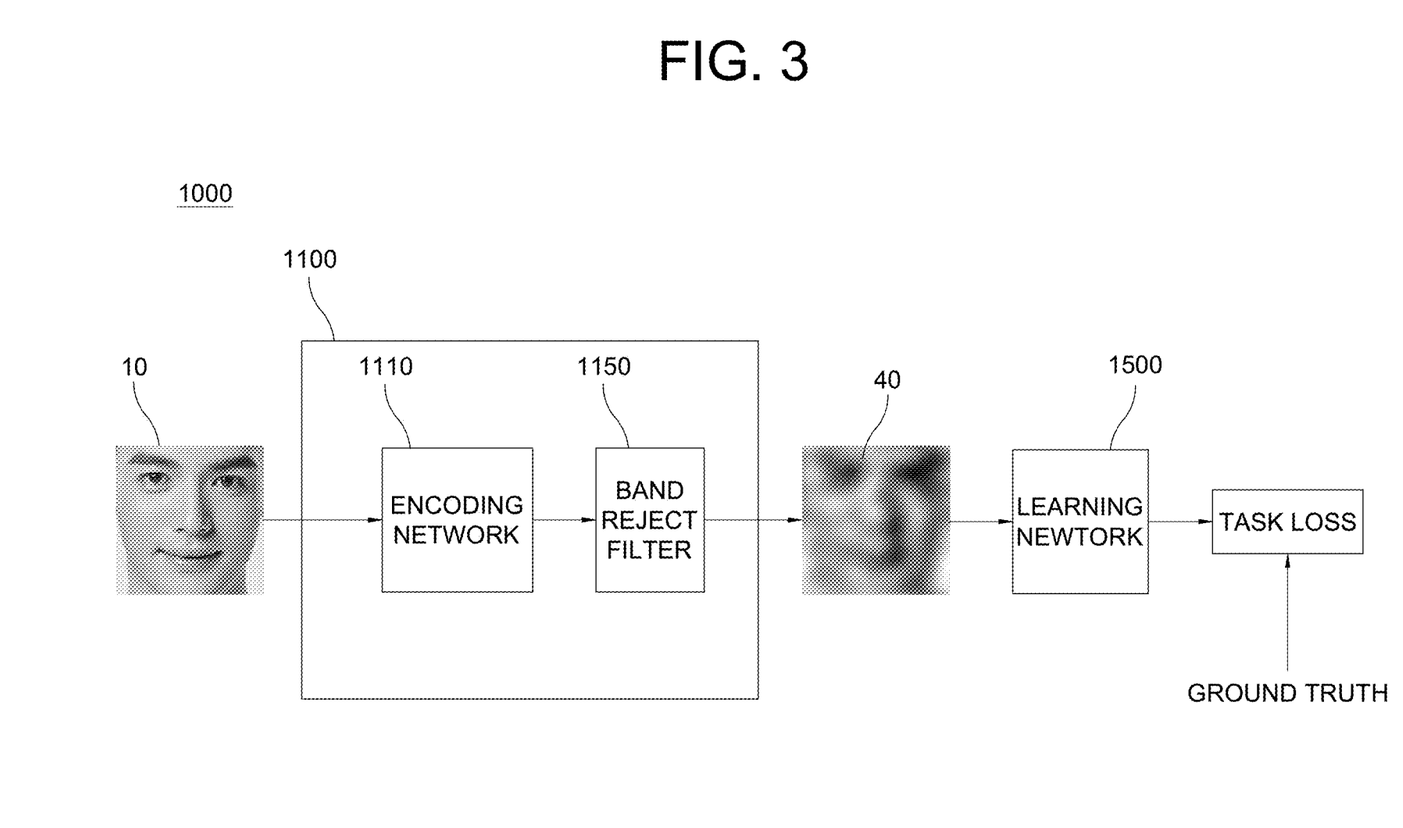
FIGS. 3 to 5 are drawings schematically illustrating the obfuscation network capable of obfuscating, e.g., anonymizing or concealing, the original data in accordance with another example embodiment of the present disclosure.
Figure 4:
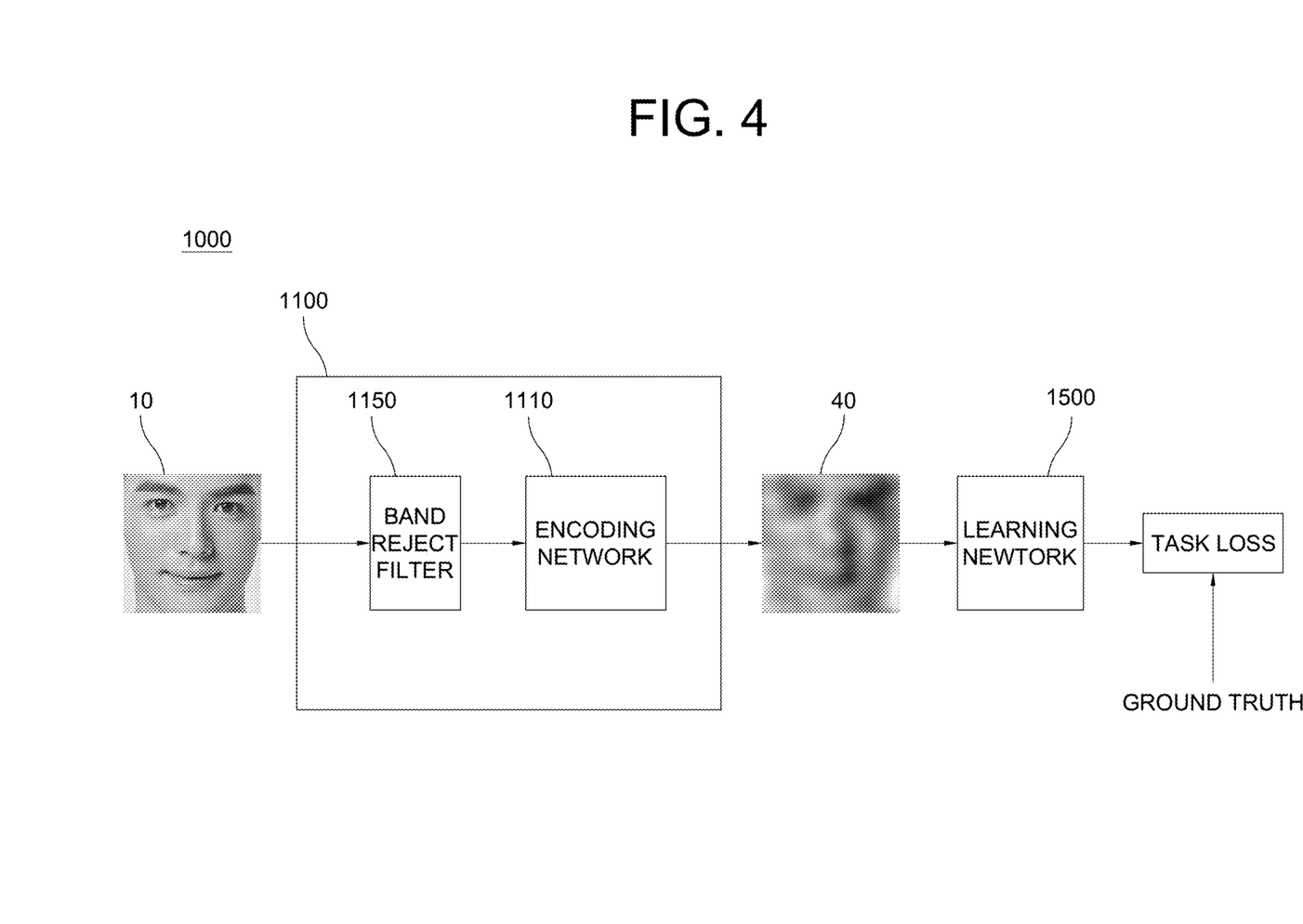

That is, as illustrated in FIGS. 3 and 4, instead of using the high-pass filter 1120 and the low-pass filter 1130 as illustrated in FIG. 2, a band reject filter 1150 may be used to generate the obfuscated data. Herein, the band reject filter 1150 may remove one or more specific frequency bands in the inputted data. Herein, the specific frequency bands may be not only be a single-band region, but also a multiple-band region.

For example, referring to FIG. 3, the obfuscation network 1100 may input the training data 10 into the encoding network 1110, to thereby instruct the encoding network 1110 to encode the training data 10 and thus generate the encoded data. Further, the obfuscation network 1100 may input the encoded data into the band reject filter 1150, to thereby instruct the band reject filter 1150 to remove one or more predetermined frequency bands, that is, the specific frequency bands in the encoded data and thus generate the obfuscated data 40.

As another example, referring to FIG. 4, the obfuscation network 1100 may input the training data 10 into the band reject filter 1150, to thereby instruct the band reject filter 1150 to remove the predetermined frequency bands, i.e., the specific frequency bands in the training data 10 and thus generate frequency-obfuscated data. Further, the obfuscation network 1100 may input the frequency-obfuscated data into the encoding network 1110, to thereby instruct the encoding network 1110 to encode the frequency-obfuscated data and thus generate the obfuscated data 40.

It is appreciated that although FIGS. 2 to 4 illustrate the obfuscation network 1100 to include the encoding network 1110, the obfuscation network 1100 may be configured as only the high-pass filter 1120 and the low-pass filter 1130.

Figure 5:
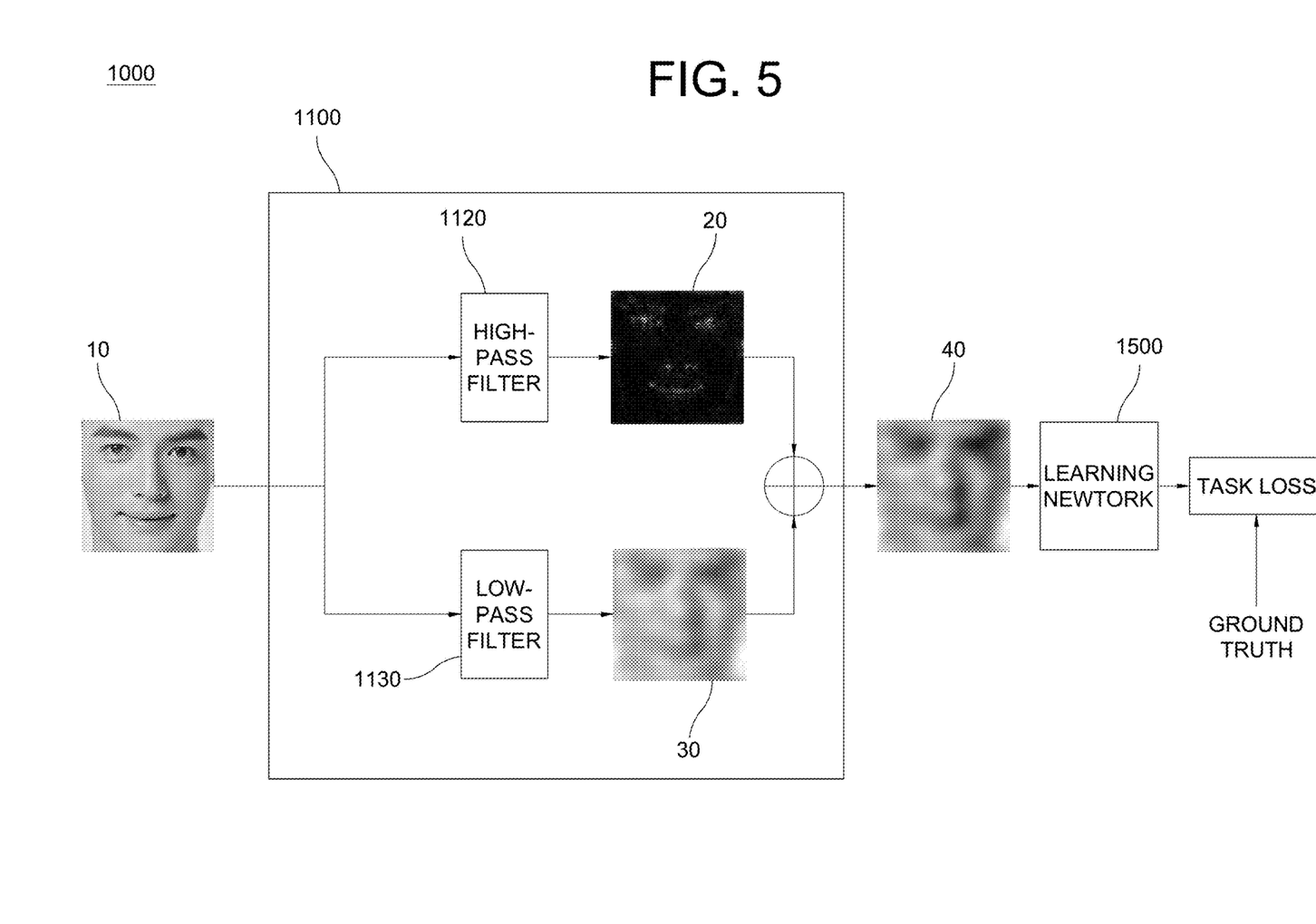

For example, by referring to FIG. 5, the obfuscation network 1100 may input the training data 10 into the high-pass filter 1120, to thereby instruct the high-pass filter 1120 to generate high-frequency data 20 by only allowing the high-frequency regions in the training data 10 to pass therethrough.

Moreover, the obfuscation network 1100 may input the training data 10 into the low-pass filter 1130, to thereby instruct the low-pass filter 1130 to generate low-frequency data 30 by only allowing the low-frequency regions in the training data 10 to pass therethrough.

Afterward, the obfuscation network 1100 may concatenate the high-frequency data 20 and the low-frequency data 30 to thereby generate the obfuscated data 40.

The high-pass filter 1120 and the low-pass filter 1130 in FIG. 2 and FIG. 5 may reject the single-band region or reject the multi-band regions according to a set value of high-frequency and/or a set value of low frequency.

Additionally, a threshold for filtering the frequency information illustrated in FIGS. 2 to 5 may be set by various methods, and may be set such that the privacy information of the inputted data is removed.

For example, by checking a range of the frequency information to be used for removing the privacy information, etc. in advance to set a fixed threshold, it is possible to remove the privacy information, etc. from the inputted data through the single-band of frequency, the multi-band of frequency, and the arbitrary set of frequency, etc. by using the fixed threshold.

Also, it is possible to remove the privacy information, etc. from the inputted data by using a dynamic threshold, i.e., a threshold value that can change depending on circumstances. For example, the threshold may be changed according to a size of the input image by using a linear relationship between the size of the input image and the threshold, or according to contents of the original data.

Furthermore, the threshold may be updated through training. For example, it is possible to train a threshold parameter targeted to generating a well obfuscated data. Herein, the well obfuscated data may be an outputted result from the obfuscation network through filtering the frequency information using the threshold obtained by the trained threshold parameter. For instance, should filtering the threshold of 60 to 80 Hz of the training data produces the obfuscated data that is not suitable, the threshold parameters are trained so that the threshold of 60 to 80 Hz is not used to obfuscate the training data. On the contrary, should filtering the threshold of 30 to 40 Hz of the training data produces the obfuscated data that is suitable, the threshold parameters are trained so that the threshold of 30 to 40 Hz is used to obfuscate the training data. The well obfuscated data may use the threshold obtained by the trained threshold parameter as GT (Ground Truth).

Figure 6:
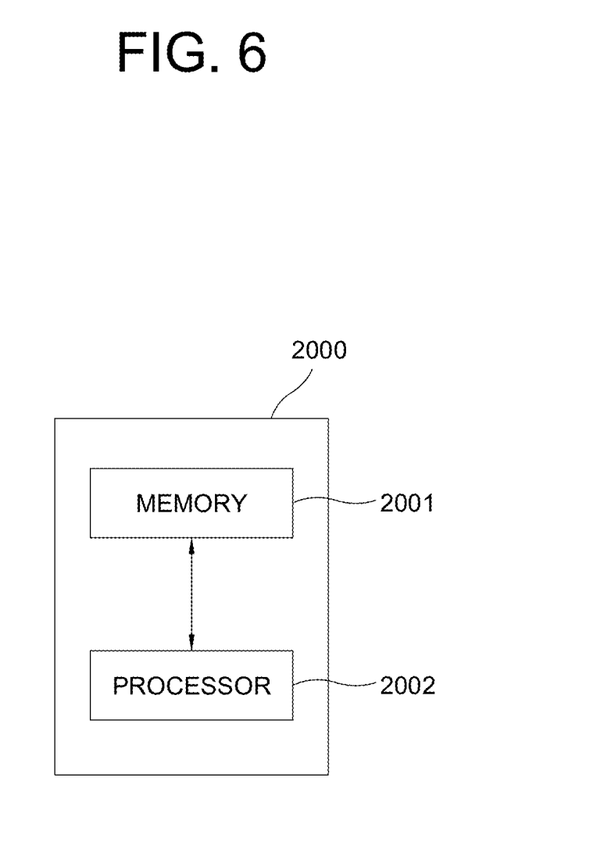
FIG. 6 is a drawing schematically illustrating a testing device for testing a trained obfuscation network in accordance with one example embodiment of the present disclosure.

Next, FIG. 6 is a drawing schematically illustrating a testing device for testing the trained obfuscation network in accordance with one example embodiment of the present disclosure.

By referring to FIG. 6, it can be seen that the testing device 2000 may include a memory 2001 for storing instructions to test the trained obfuscation network trained to obfuscate the original data into the obfuscated data such that an outputted result of the learning network by using the obfuscated data as an input is same as or similar to an outputted result of the learning network by using the original data as an input, and a processor 2002 for performing processes to test the trained obfuscation network for obfuscating the privacy information according to the instructions in the memory 2001 in accordance with one example embodiment of the present disclosure.

Specifically, the testing device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

The testing device 2000 for testing the obfuscation network capable of obfuscating, e.g., anonymizing or concealing, the original data for privacy in accordance with one example embodiment of the present disclosure is described by referring to FIG. 7 as follows.

Figure 7:
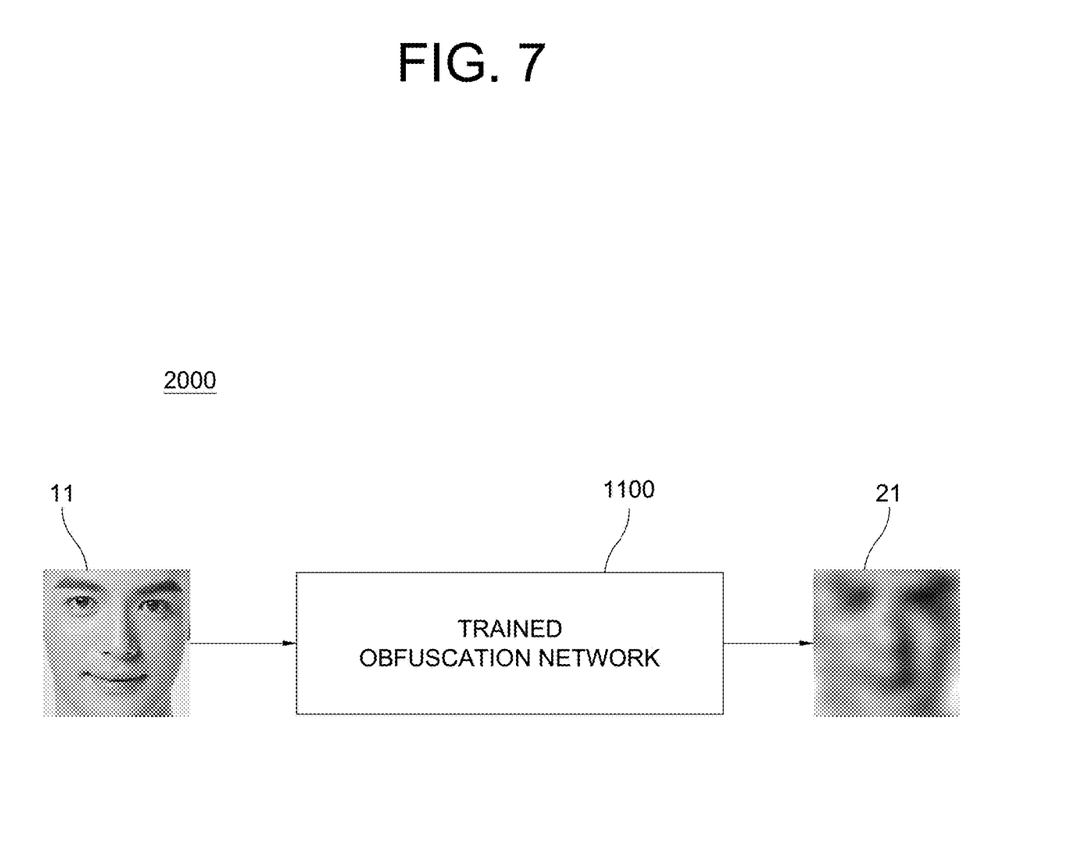
FIG. 7 is a drawing schematically illustrating a testing method for testing the trained obfuscation network in accordance with one example embodiment of the present disclosure.

By referring to FIG. 7, the testing device 2000 may input the training data 11 into the trained obfuscation network 1100 trained to obfuscate the original data, to thereby instruct the obfuscation network 1100 to output the obfuscated data 21 by obfuscating the training data 11. Herein, the trained obfuscation network 1100 has been trained to generate the obfuscated data from the original data such that the outputted result of the learning network by using the obfuscated data as an input is same as or similar to the outputted result of the learning network by using the original data as an input.

Herein, the obfuscation network 1100 may have already been trained by using the training data.

That is, as illustrated in FIGS. 2 to 5, the trained obfuscation network may be trained by the learning device performing processes of (i) inputting first training data into the obfuscation network, to thereby instruct the obfuscation network to the filter frequency information of the first training data and thus generate first obfuscated data, and (ii) (ii-1) inputting the first obfuscated data into a first learning network designed to perform a first task, to thereby instruct the first learning network to generate first characteristic information by performing learning operation on the first obfuscated data, (ii-2) generating a first task loss by referring to the first characteristic information and its corresponding ground truth or the first task-specific output, generated by using the first characteristic information, and its corresponding ground truth, and (ii-3) training at least one of the first learning network and the obfuscation network through a backpropagation of the first task loss, thereby allowing the obfuscation network to be the trained obfuscation network.

On condition that the trained obfuscation network 1100 has been trained as above, the testing device 2000 may input second training data into the trained obfuscation network 1100, to thereby instruct the trained obfuscation network 1100 to filter the frequency information of the second training data and thus generate second obfuscated data. Herein, the second training data may be same as the first training data or a newly sampled training data from a database from which the first training data was sampled.

Herein, the testing device 2000 may input the training data, that is the second training data 11 into the trained obfuscation network 1100, to thereby instruct the trained obfuscation network 1100 to (i) generate the encoded data by encoding the second training data 11 through a trained encoding network, (ii) generate the high-frequency data by only allowing high-frequency regions in the encoded data to pass through the high-pass filter, (iii) generate the low-frequency data by only allowing low-frequency regions in the second training data 11 to pass through the low-pass filter, and (iv) concatenate the high-frequency data and the low-frequency data to generate the second obfuscated data.

Further, the testing device 2000 may input the second training data 11 into the trained obfuscation network 1100, to thereby instruct the trained obfuscation network 1100 to (i) generate high-frequency data by only allowing high-frequency regions in the second training data 11 to pass through the high-pass filter, (ii) generate low-frequency data by only allowing low-frequency regions in the second training data 11 to pass through the low-pass filter, and (iii) concatenate the high-frequency data and the low-frequency data to generate the second obfuscated data.

Furthermore, the testing device 2000 may input the second training data 11 into the trained obfuscation network 1100, to thereby instruct the trained obfuscation network 1100 to (i) generate the encoded data by encoding the second training data 11 through the trained encoding network, and (ii) generate the second obfuscated data by removing one or more predetermined frequency bands in the encoded data through the band reject filter.

Moreover, the testing device 2000 may input the second training data 11 into the trained obfuscation network 1100, to thereby instruct the trained obfuscation network 1100 to (i) generate the frequency-obfuscated data by removing one or more predetermined frequency bands in the second training data 11 through the band reject filter, and (ii) generate the second obfuscated data by encoding the frequency-obfuscated data through the trained encoding network.

Figure 8:
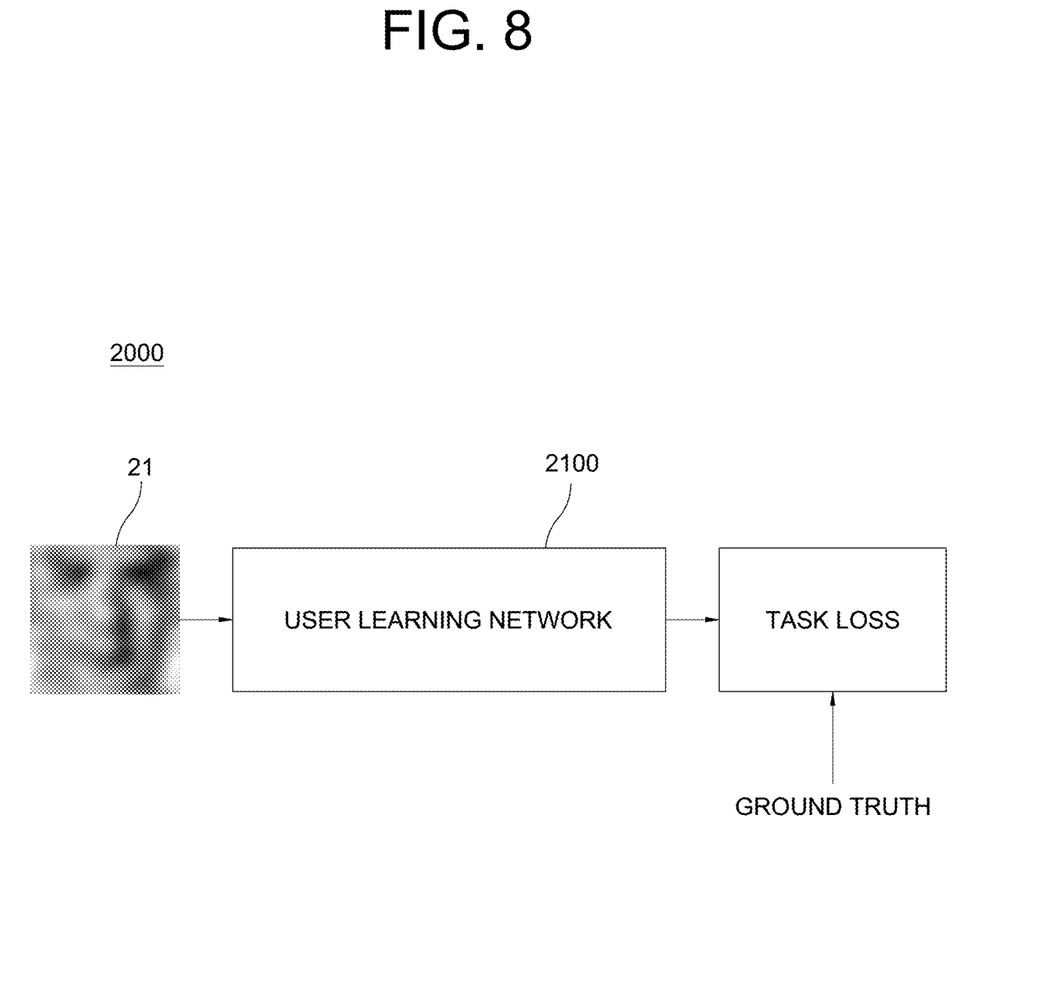
FIG. 8 is a drawing schematically illustrating a method for training a user learning network using the obfuscated data generated by testing of the trained obfuscation network in accordance with one example embodiment of the present disclosure.

Next, FIG. 8 illustrates the second characteristic information which is generated by the testing device 2000. Herein, the testing device 2000 inputs the second obfuscated data 21 into a user learning network, i.e., the second learning network 2100, designed to perform the second task, to thereby instruct the second learning network 2100 to perform the learning operation on the second obfuscated data 21 and thus generate the second characteristic information.

Afterward, the testing device 2000 may generate the task loss i.e., the second task loss, by referring to the second characteristic information and its corresponding ground truth or the second task-specific output, generated by using the second characteristic information, and its corresponding ground truth, and may train the second learning network 2100 through a backpropagation of the second task loss. From above, the user learning network may use the obfuscated data to perform the second task.

Additionally, the testing device 2000 may evaluate a trained user learning network, i.e., a trained second learning network by using third training data or third obfuscated data, acquired by filtering the frequency information of the third training data through the trained obfuscation network 1100. Herein, the third training data and the third obfuscated data may be same as the first training data and the first obfuscated data. However, contrary to the above, the third training data may be a newly sampled training data from the database wherefrom the second training data was sampled, and the third obfuscated data may be obfuscated data generated by obfuscating the third training data through the trained obfuscation network.

For example, the testing device 2000, may (i) input the third training data or the third obfuscated data, acquired by filtering the frequency information of the third training data through the trained obfuscation network, into the trained second learning network, to thereby instruct the trained second learning network to generate third characteristic information by performing the learning operation on the third training data or the third obfuscated data, and (ii) evaluate the trained second learning network by using the third characteristic information or a third task-specific output generated from the third characteristic information. That is, a performance of the second learning network may be evaluated by measuring an accuracy of the second learning network by referring to the third characteristic information and its corresponding ground truth or the third task-specific output, generated by using the third characteristic information, and its corresponding ground truth.

Meanwhile, the obfuscated data, which is obfuscated, e.g., anonymized or concealed, by the trained obfuscation network in accordance with the present disclosure may be provided or sold to a buyer of big data of images.

Also, in accordance with one example embodiment of the present disclosure, when the obfuscated image data, e.g., anonymized image data or concealed image data, are provided or sold to the buyer, the testing method of the trained obfuscation network may be provided as implemented in a form of program instructions executable by a variety of computer components and recorded to computer readable media. In accordance with one example embodiment of the present disclosure, the buyer may execute the program instructions recorded in the computer readable media by using the computer devices, to thereby generate obfuscated data from the original data owned by the buyer or acquired from other sources, and use the obfuscated data for his/her own learning network. Additionally, the buyer may use at least two of the obfuscated data, the original image data owned by the buyer or acquired from other sources, and the obfuscated image data provided or sold to the buyer, together for the buyer's learning network.

Meanwhile, if the testing method of the trained obfuscation network is implemented as the program instructions that can be executed by a variety of the computer components, then computational overhead may occur in the computing devices of the buyer when accuracy of the trained obfuscation network is set as high. Therefore, in accordance with one example embodiment of the present disclosure, the buyer is allowed to lower the accuracy to prevent the computational overhead.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high-level code that can be used by an interpreter etc., which is executed by a computer. The aforementioned hardware device can work as more than a software module to perform the action of the present disclosure and they can do the same in the opposite case.

The present disclosure has an effect of performing obfuscation, e.g., anonymization or concealment on the privacy information in a simple and accurate way.

The present disclosure has another effect of protecting privacy and security of the original data by generating the obfuscated data, e.g., anonymized data or concealed data, through irreversibly obfuscating the original data.

The present disclosure has still another effect of generating the obfuscated data recognized as similar or same by computers, but recognized as different by humans.

The present disclosure has still yet another effect of stimulating a big data trade market.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for training an obfuscation network capable of obfuscating original data for privacy, comprising steps of:
    (a) a learning device inputting training data into the obfuscation network, to thereby instruct the obfuscation network to filter frequency information of the training data and thus generate obfuscated data; and
    (b) the learning device (i) inputting the obfuscated data into a learning network designed to perform a specific task, to thereby instruct the learning network to generate characteristic information by performing learning operation on the obfuscated data, (ii) generating at least one task loss by referring to (ii-1) the characteristic information and its corresponding ground truth or (ii-2) a task-specific output, generated by using the characteristic information, and its corresponding ground truth, and (iii) training at least one of the learning network and the obfuscation network through a backpropagation of the task loss.

2. The learning method of claim 1, wherein, at the step of (a), the learning device inputs the training data into the obfuscation network, to thereby instruct the obfuscation network to (i) generate encoded data by encoding the training data through an encoding network, (ii) generate high-frequency data by only allowing high-frequency regions in the encoded data to pass through a high-pass filter, (iii) generate low-frequency data by only allowing low-frequency regions in the training data to pass through a low-pass filter, and (iv) concatenate the high-frequency data and the low-frequency data to generate the obfuscated data.

3. The learning method of claim 2, wherein, at the step of (b), the learning device (i) (i-1) inputs the obfuscated data into the learning network, to thereby instruct the learning network to generate first characteristic information by performing the learning operation on the obfuscated data, (i-2) generates a first task loss by referring to the first characteristic information and its corresponding ground truth or a first task-specific output, generated by using the first characteristic information, and its corresponding ground truth, and (i-3) trains the learning network through a first backpropagation of the first task loss, thereby allowing the learning network to be a trained learning network, and (ii) (ii-1) inputs the obfuscated data into the trained learning network, to thereby instruct the trained learning network to generate second characteristic information by performing the learning operation on the obfuscated data, (ii-2) generates a second task loss by referring to the second characteristic information and its corresponding ground truth or a second task-specific output, generated by using the second characteristic information, and its corresponding ground truth, and (ii-3) trains the encoding network through a second backpropagation of the second task loss.

4. The learning method of claim 1, wherein, at the step of (a), the learning device inputs the training data into the obfuscation network, to thereby instruct the obfuscation network to (i) generate high-frequency data by only allowing high-frequency regions in the training data to pass through a high-pass filter, (ii) generate low-frequency data by only allowing low-frequency regions in the training data to pass through a low-pass filter, and (iii) concatenate the high-frequency data and the low-frequency data to generate the obfuscated data.

5. The learning method of claim 1, wherein, at the step of (a), the learning device inputs the training data into the obfuscation network, to thereby instruct the obfuscation network to (i) generate encoded data by encoding the training data through an encoding network, and (ii) generate the obfuscated data by removing one or more predetermined frequency bands in the encoded data through a band reject filter.

6. The learning method of claim 1, wherein, at the step of (a), the learning device inputs the training data into the obfuscation network, to thereby instruct the obfuscation network to (i) generate frequency-obfuscated data by removing one or more predetermined frequency bands in the training data through a band reject filter, and (ii) generate the obfuscated data by encoding the frequency-obfuscated data through an encoding network.

7. A learning device for training an obfuscation network capable of obfuscating original data for privacy, comprising:
    at least one memory that stores instructions; and
    at least one processor configured to execute the instructions to perform: processes of (I) inputting training data into the obfuscation network, to thereby instruct the obfuscation network to filter frequency information of the training data and thus generate obfuscated data; and (II) (i) inputting the obfuscated data into a learning network designed to perform a specific task, to thereby instruct the learning network to generate characteristic information by performing learning operation on the obfuscated data, (ii) generating at least one task loss by referring to (ii-1) the characteristic information and its corresponding ground truth or (ii-2) a task-specific output, generated by using the characteristic information, and its corresponding ground truth, and (iii) training at least one of the learning network and the obfuscation network through a backpropagation of the task loss.

8. The learning device of claim 7, wherein, at the process of (I), the processor inputs the training data into the obfuscation network, to thereby instruct the obfuscation network to (i) generate encoded data by encoding the training data through an encoding network, (ii) generate high-frequency data by only allowing high-frequency regions in the encoded data to pass through a high-pass filter, (iii) generate low-frequency data by only allowing low-frequency regions in the training data to pass through a low-pass filter, and (iv) concatenate the high-frequency data and the low-frequency data to generate the obfuscated data.

9. The learning device of claim 8, wherein, at the process of (II), the processor (i) (i-1) inputs the obfuscated data into the learning network, to thereby instruct the learning network to generate first characteristic information by performing the learning operation on the obfuscated data, (i-2) generates a first task loss by referring to the first characteristic information and its corresponding ground truth or a first task-specific output, generated by using the first characteristic information, and its corresponding ground truth, and (i-3) trains the learning network through a first backpropagation of the first task loss, thereby allowing the learning network to be a trained learning network, and (ii) (ii-1) inputs the obfuscated data into the trained learning network, to thereby instruct the trained learning network to generate second characteristic information by performing the learning operation on the obfuscated data, (ii-2) generates a second task loss by referring to the second characteristic information and its corresponding ground truth or a second task-specific output, generated by using the second characteristic information, and its corresponding ground truth, and (ii-3) trains the encoding network through a second backpropagation of the second task loss.

10. The learning device of claim 7, wherein, at the process of (I), the processor inputs the training data into the obfuscation network, to thereby instruct the obfuscation network to (i) generate high-frequency data by only allowing high-frequency regions in the training data to pass through a high-pass filter, (ii) generate low-frequency data by only allowing low-frequency regions in the training data to pass through a low-pass filter, and (iii) concatenate the high-frequency data and the low-frequency data to generate the obfuscated data.

11. The learning device of claim 7, wherein, at the process of (I), the processor inputs the training data into the obfuscation network, to thereby instruct the obfuscation network to (i) generate encoded data by encoding the training data through an encoding network, and (ii) generate the obfuscated data by removing one or more predetermined frequency bands in the encoded data through a band reject filter.

12. The learning device of claim 7, wherein, at the process of (I), the processor inputs the training data into the obfuscation network, to thereby instruct the obfuscation network to (i) generate frequency-obfuscated data by removing one or more predetermined frequency bands in the training data through a band reject filter, and (ii) generate the obfuscated data by encoding the frequency-obfuscated data through an encoding network.

\* \* \* \* \*